United States Patent [19]

Yamada

[11] Patent Number: 5,659,770

[45] Date of Patent: Aug. 19, 1997

[54] TEXT/IMAGE PROCESSING APPARATUS DETERMINING SYNTHESIS FORMAT

[75] Inventor: Masanori Yamada, Kawasaki, Japan

[73] Assignee: Canon Kabushiki Kaisha, Tokyo, Japan

[21] Appl. No.: 310,807

[22] Filed: Sep. 22, 1994

Related U.S. Application Data

[63] Continuation of Ser. No. 26,106, Mar. 1, 1993, abandoned, which is a continuation of Ser. No. 754,307, Sep. 4, 1991, abandoned, which is a continuation of Ser. No. 298,353, Jan. 18, 1989, abandoned.

[30] Foreign Application Priority Data

Jan. 19, 1988 [JP] Japan ..................... 63-10139

[51] Int. Cl.⁶ .................... G06F 17/24; H04N 1/387
[52] U.S. Cl. .................... 395/792; 395/779; 395/789; 395/782; 358/452; 358/450
[58] Field of Search ..................... 395/147, 148, 395/146, 145, 161, 135, 128, 792, 779, 782, 783, 774, 943, 946, 790, 789; 358/452, 453, 450

[56] References Cited

U.S. PATENT DOCUMENTS

| | | | |
|---|---|---|---|
| 3,949,159 | 4/1976 | Ricards et al. | 358/452 |
| 4,034,400 | 7/1977 | Owen et al. | 358/450 X |
| 4,345,276 | 8/1982 | Colomb | 358/450 X |
| 4,729,037 | 3/1988 | Doelves | 358/443 X |
| 4,760,467 | 7/1988 | Marazzi et al. | 358/303 |
| 4,775,886 | 10/1988 | Hirosawa et al. | 358/452 X |
| 4,878,130 | 10/1989 | Shimizu et al. | 358/400 |
| 4,899,227 | 2/1990 | Yamada et al. | 358/452 |
| 4,905,095 | 2/1990 | Yamada | 358/451 |
| 4,920,502 | 4/1990 | Yamada et al. | 358/451 X |
| 4,949,188 | 8/1990 | Sato | 358/452 X |
| 5,170,467 | 12/1992 | Kubota et al. | 395/782 |

*Primary Examiner*—Raymond J. Bayerl
*Attorney, Agent, or Firm*—Fitzpatrick, Cella, Harper & Scinto

[57] ABSTRACT

A text/image processing apparatus obtains image information by extracting resolution, tone, and hue to an extent that editing information such as image layout information associated with a document image can be sufficiently generated, the image information is read from a scanner, and high-quality, low-cost synthesis of image information and text information can be performed in real time on the basis of determined editing information. This apparatus includes a PDL (page description language) decoder in an interface, so that a host can perform high-quality image synthesis regardless of attributes of a printer, and the scanner can perform trimming such as magnification and movement, thereby easily performing synthesis of the text and the image.

19 Claims, 9 Drawing Sheets

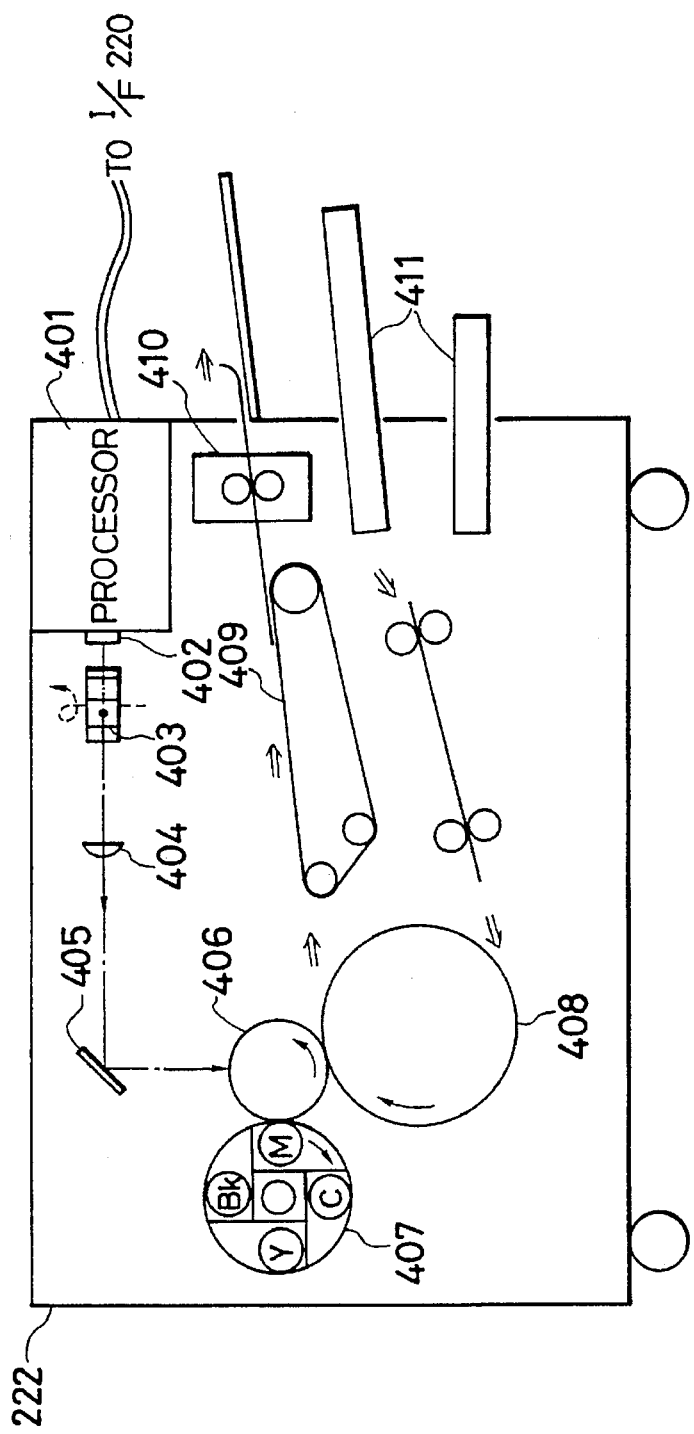
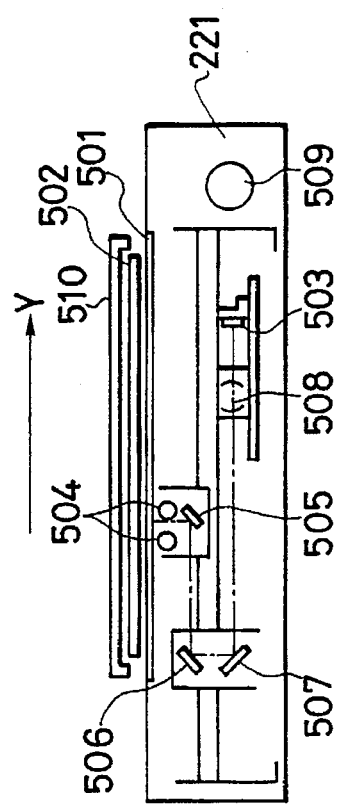
FIG. 4
FIG. 5

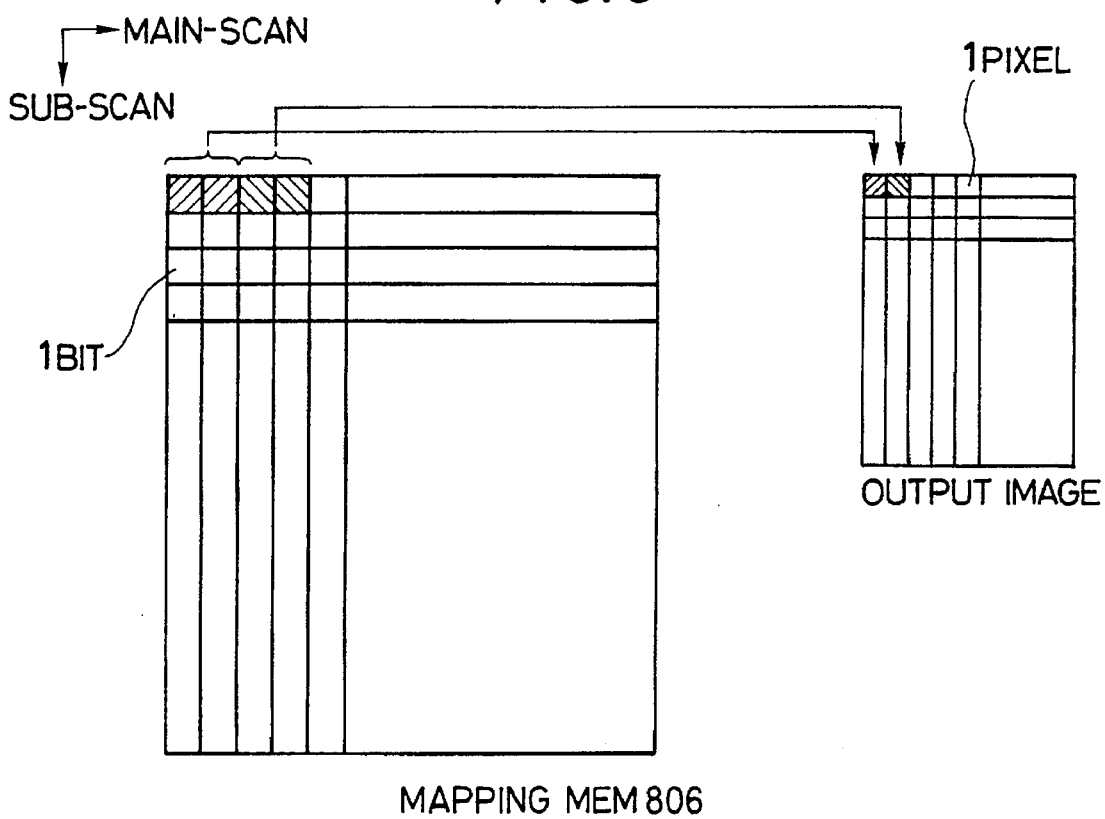

TEXT/IMAGE PROCESSING APPARATUS DETERMINING SYNTHESIS FORMAT

This application is a continuation of application Ser. No. 08/026,106 filed Mar. 1, 1993, now abandoned, which is a continuation of application Ser. No. 07/754,307 filed Sep. 4, 1991, now abandoned, which was a continuation of application Ser. No. 07/298,353, filed Jan. 18, 1989, now abandoned.

BACKGROUND OF THE INVENTION

1. Field of the Invention

The present invention relates to an apparatus for processing a text and an image together and, more particularly, to a text/image processing apparatus for synthesizing a text and a document image.

2. Related Background Art

An arrangement of a conventional text/image processing apparatus will be described with reference to FIG. 2. The apparatus includes a host 200, an interface 220, a scanner 221, and a printer 222. A CPU 201 uses a RAM 203, an interrupt (INT.) controller 204, a timer/counter 205, and the like in accordance with firmware in a ROM 202 to control the overall operation of the apparatus.

A disc controller 217 controls a disc drive (not shown) and controls read/write access to a floppy disc (FD) 218 and a hard disc (HD) 219. OS's, application programs, and data files composed of images and characters are stored in these discs. A keyboard (KB) 208 and a mouse 209 are connected to a CPU bus 223 through an I/O port 206. The I/O port 206 is also connected to external equipment indicated generally at 207. The I/O port 206 includes communication ports such as an RS232c and SCSi.

A CRT controller 211 displays contents of a display memory (VRAM) 213 on a CRT 210.

The scanner/printer interface (SCN/PRT IF) 220 fetches image information from the scanner 221 and sends out image data to the printer 222 in accordance with commands from the CPU 201. Image memories (IMEM1 and IMEM2) 232 and 233 are respectively bit map memories for storing image data read from the scanner and image data printed by the printer.

A text memory (TEXT MEM) 230 stores codes corresponding to characters of a text file (to be referred to as a text file) generated on the CRT by using the keyboard 208 and the mouse 209. A graphic memory (GMEM) 231 stores graphic information (to be referred to as a graphic file hereinafter) generated on the CRT.

Graphic information is stored as a bit image corresponding to a CRT display pixel or as vector information. The text and graphic files are normally stored in the floppy and hard discs 218 and 219. These files are called to the text memory 230 and the graphic memory 231 when they are edited on the CRT. The concept of synthesis of a text and a document image will be described with reference to FIGS. 2 and 3. A code-image converter 252 develops the text file in the text memory 230 into the VRAM 213 with reference to a font ROM 212. A graphic processor 251 transfers the bit image in the graphic memory 231 to the VRAM 213 by using a DMA controller 214 shown in FIG. 2. When the text file is stored as vector information, the graphic processor 251 vector-raster converts it into a bit image. The resultant bit image is developed in the VRAM 213. A natural image processor 250 reads out the size of the document image read by the scanner from the image memory 232 and reduces the size of the document image. The size-reduced document image is transferred to the VRAM 213. The converter 252 and the processors 250 and. 251 are controlled by the CPU 201 in FIG. 2. An exclusive (dedicated) CPU may be arranged to control the converter 252 and the processors 250 and 251 for high-speed processing, or the CRT controller 211 controls these components. A display information table 254 of image layout information representing portions of the text file and the graphic or image file in the VRAM 213 is stored in the RAM 203 in FIG. 2.

An operator edits the information displayed on the CRT with the keyboard 208 and the mouse 209. A synthesized image consisting of characters, figures, and images is edited on the CRT. During editing, the display information table 254 is continuously updated.

When a print request is input at the end of editing, the CPU 201 (FIG. 2) develops necessary information from the text memory 230, the graphic memory 231, and the image memory 232 in the image memory 233 as a bit image corresponding to a printer coordinate system. The developed information is output to the printer 222 through the scanner/printer interface (220 in FIG. 2), and the synthesized image consisting of characters, graphic patterns and the document image is printed. The image memory 233 may be a full-page memory for storing a one-page printing bit image or a partial buffer memory sufficient to cope with the developing speed of the image memory 233.

The natural image processor 250 extracts a desired portion of the document image information in the image memory 232 and performs various operations such as rotation, mirror image processing, and dark/bright reversing in addition to enlargement and reduction.

In the case of FIG. 3, the image memory 232 has a capacity of about 2 Mbytes so as to allow A4 size reading and printing at a resolution of 400 dots/inch.

The resolution of the CRT 210 is assumed to be 640 dots × 480 dots for monochromatic display, so that the VRAM 213 must have a capacity of 38 Kbytes.

The graphic memory 231 has a capacity of 38 Kbytes as a bit image memory.

The text memory 230 has a capacity of about 2 Kbytes when display of 40 digits and 25 lines is performed and a character code is given as 2-byte data.

At the time of development in the image memory 233, the contents of the VRAM 213 can be directly transferred from the CRT coordinate system to the printer coordinate system through a coordinates converter 253.

The feature of the conventional arrangement lies in the feature that a synthesized image of document image information and the text and graphic data is generated in the image memory 233 and is printed by the printer.

When the same arrangement as described above is designed incorporating a scanner and a printer which can input/output multivalue image information or full-color image information, the image memories 232 and 233 require a very large capacity. For example, in the case of a full-color image, if 8-bit R(red) data, 8-bit G (green) data, and 8-bit B (blue) data are used, A4 size at a resolution of 400 dots/inch requires a capacity of about 45 Mbytes, thus requiring an expensive memory. Even if such a large-capacity memory is available, a long time is required for handling of image data during editing. The response time on the CRT is undesirably prolonged and its operability is degraded.

In addition, since the volume of image data sent from the scanner is greatly increased, various problems are posed in transmission speed, transmission line capacity, and data fetching speed.

Image information may be compressed into codes, and the codes may be stored in the image memory. In this case, a data compressor and a data expander are required and the size of the electrical circuit and hence the cost are increased.

It is also possible to process all image data extracted in correspondence with the capacity of an image memory which can be mounted in the apparatus. In this case, performance of the scanner and the printer cannot be optimally utilized, and a high-quality synthesized output cannot be obtained.

SUMMARY OF THE INVENTION

The present invention has been made in consideration of the above situation, and has as its object to provide a text/image processing apparatus wherein image information obtained by extracting resolution, tone, and hue to an extent that editing information such as image layout information associated with the document image can be sufficiently generated is read from the scanner, and high-quality, low-cost synthesis of the image information and text information can be performed in real time on the basis of the determined editing information.

In order to achieve the above object of the present invention, there is provided a text/image processing apparatus including a PDL decoder in an interface, so that a host can perform high-quality image synthesis regardless of attributes of the printer, and the scanner can perform trimming such as magnification and movement, thereby easily performing synthesis of the text and the image.

BRIEF DESCRIPTION OF THE DRAWINGS

FIG. 4 is a schematic view showing a printer used in the present invention;

FIG. 5 is a schematic view showing a scanner used in the present invention;

FIGS. 9 and 10 are views showing a mapping memory and color codes according to the second embodiment of the present invention.

DETAILED DESCRIPTION OF THE PREFERRED EMBODIMENTS

[Scanner]

Figure 1:
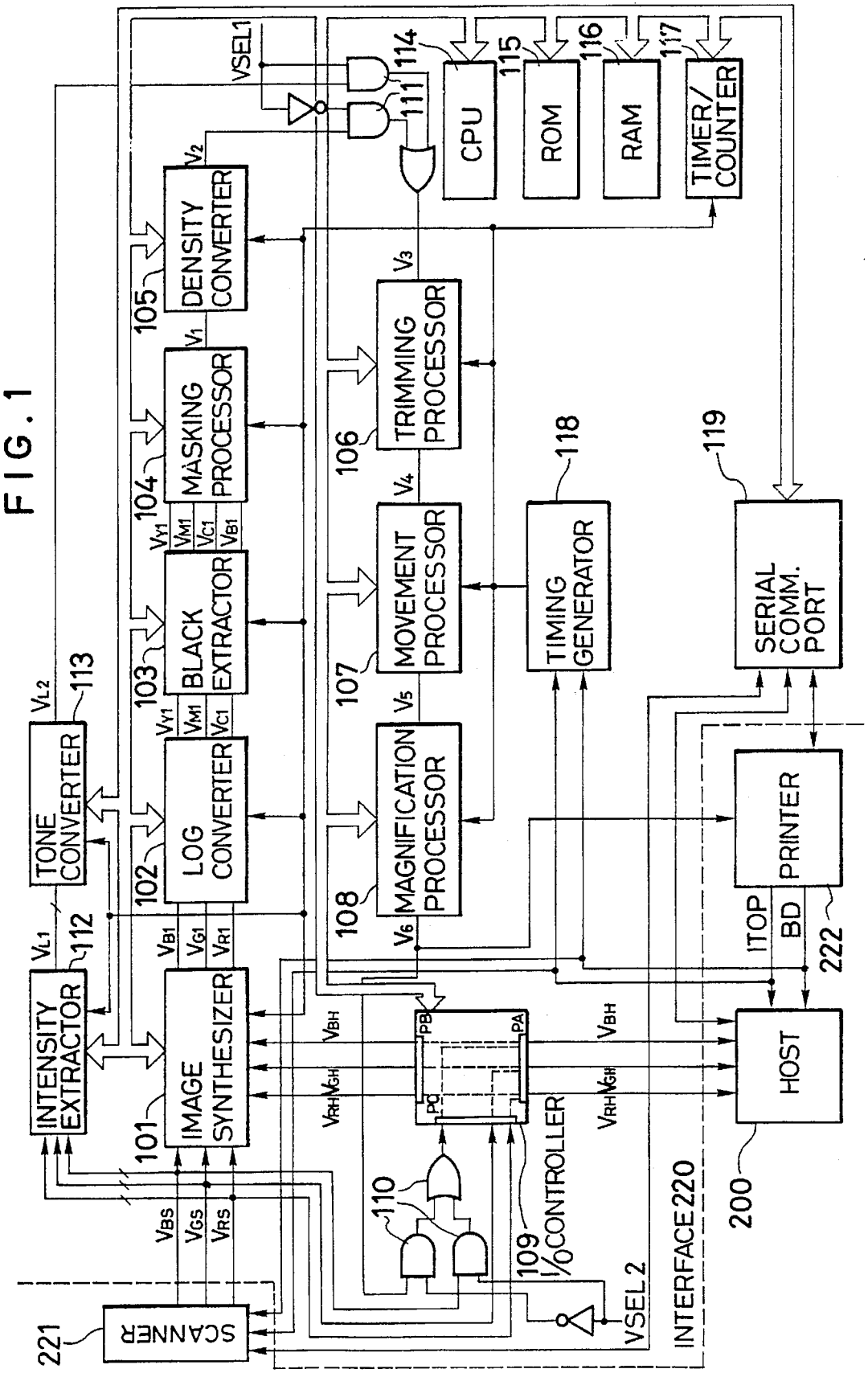
FIG. 1 is a block diagram showing an interface according to the present invention.

An example of the scanner 221 used in the present invention is shown in FIG. 5.

The scanner 221 comprises a document table 501, a document holder 502, an image reading CCD 503, a document illumination fluorescent lamp 504, mirrors 505, 506, and 507, and a focusing lens 508. The fluorescent lamp 504 and the mirror 505 scan the original in the Y direction and sequentially form a document image on the CCD 503.

The CCD 503 comprises three CCD elements on which blue (B), green (G), and red (R) filters are deposited.

Light reflected by a document is separated into three color beams through the corresponding filters. The color beams are photoelectrically converted by the corresponding CCD elements. Three color analog signals from the CCD elements are A/D-converted into 8-bit signals. The 8-bit signals are subjected to shading correction in units of colors. The corrected signals are output to the interface 220.

Output signals are given as $V_{BS}$, $V_{GS}$, and $V_{RS}$ shown in FIG. 1.

A read magnification of the scanner is a one-to-one size in the CCD scanning direction (i.e., main-scan direction) and is variable in the Y direction (i.e., sub-scan direction) by controlling the scanning speed by an optical drive motor 509.

[Printer]

The printer 222 used in the present invention is shown in FIG. 4.

The printer 222 is a full-color laser beam printer. An image signal sent from the interface 220 is PWM-modulated by a processor 401 to match with the printer characteristics. A semiconductor laser 402 is then driven by the PWM signal.

A laser beam generated by the semiconductor laser 402 is main-scanned by a polygonal mirror 403 and is focused to form a latent image on a photosensitive drum 406 through an optical system 404 and a mirror 405.

A rotary developing unit 407 develops the latent image formed on the photosensitive drum 406 by using toners, and the toner image is transferred to paper on a transfer drum 408.

A sheet is selectively fed from one of sheet cassettes 411 and is wound around the transfer drum 408. An image is formed on the sheet. The rotary developing unit 407 sequentially develops the image with Y (yellow), M (magenta), C (cyan), and B (black) toners in accordance with image signals sequentially supplied from the interface 220, that is, Y, M, C, and Bk color signals.

After all the toners, i.e., Y, M, C, and Bk toners are transferred to the sheet, the sheet is conveyed along a conveyor belt 409 and passes through a fixing unit 410. The full-color image on the sheet is fixed, and the sheet is delivered.

[Interface]

FIG. 1 is a block diagram of the interface 220 according to the present invention, and the interface 220 will be described below. The interface 220 includes a CPU 114, a ROM 115, a RAM 116, and a timer/counter 117 Output signals $V_{BS}$, $V_{GS}$, and $V_{RS}$ from the scanner are synthesized with image signals $V_{BH}$, $V_{GH}$, and $V_{RH}$ from the host by an image synthesizer 101 in units of colors. Alternatively, the output signals $V_{BS}$, $V_{GS}$, and $V_{RS}$ are directly supplied to a log converter 102.

Signals $V_{Y1}$, $V_{M1}$, and $V_{C1}$ intensity-density converted by log conversion in the log converter 102 together with a Min($V_{Y1}$,$V_{M1}$,$V_{C1}$) extracted by a black extractor 103, i.e., a black signal $V_{k1}$ serve as four color image signals. The filter and toner density characteristics of these image signals are corrected by a masking processor 104. One of the UCR (undercolor removal) processed four color signals is selected, and the selected signal appears as a signal $V_1$. Therefore, the signal $V_1$ may be one of the Y (yellow), M (magenta), C (cyan), and K (black) color signals. The signal is then gamma-corrected by a density converter 105 and is input to a gate circuit 111 as a signal $V_2$.

The gate circuit 111 selects one of an image signal $V_{L2}$ and the signal $V_2$ in accordance with a selection signal VSEL1. The selected signal is input to a trimming processor 106 as an image signal $V_3$. An arbitrary interval in the main-scan direction is set at "0" level by the trimming processor 106, thereby achieving trimming processing. A trimmed image signal $V_4$ is shifted by for a main-scan interval corresponding to an arbitrary number of pixels by a movement processor 107. An output signal $V_5$ from the movement processor 107 is reduced or enlarged by a magnification processor 108 at an arbitrary magnification in the main-scan direction. An image signal $V_6$ output from the magnification processor 108 is input to the printer 222 or the gate circuit 110.

A gate circuit 110 selects one of the image signal $V_{BS}$ shading-corrected by the scanner and the output $V_6$ from the processor 108 in accordance with a selection signal VSEL2. The selected signal is input to a bidirectional I/O controller 109. The I/O controller 109 also receives the image signals $V_{GS}$ and $V_{RS}$ from the scanner in addition to one of the signals $V_{BS}$ and $V_6$. An alternative selection may be made between the signal $V_6$ and the signal $V_{GS}$ or $V_{RS}$ in place of the signal $V_{BS}$. The controller 109 has three image signal ports PA, PB, and PC.

The port PA is a bidirectional port for outputting the image signals $V_{BH}$, $V_{GH}$, and $V_{RH}$ to the host or inputting them from the host.

The port PB outputs the image signal input from the port PA to the image synthesizer 101.

The image signal input from the port PC may be output from the port PA to the host. A mode for outputting the input from the port PA to the port PB and a mode for outputting the input from the port PC to the port PA can be controlled by the CPU 114.

The image signals $V_{BS}$, $V_{GS}$, and $V_{RS}$ from the scanner are also input to an intensity extractor 112. For example, an intensity or luminance signal $V_{L1}$ given by the following equation can be output from the intensity extractor 112:

$$V_{L1}=0.30\times V_{RS}+0.59\times V_{GS}+0.11\times V_{BS}$$

A tone converter 113 converts the 8-bit image signal $V_{L1}$ into an n-bit (where $n \leq 8$) image signal $V_{L2}$. In this case, a conversion scheme may be simple n-value conversion using a fixed slice value or n-value conversion capable of reproducing a halftone by using a dither pattern.

The printer 222 outputs a horizontal sync signal BD and a vertical sync signal ITOP to a timing generator 118, the scanner 221 and the host.

Clocks required for the respective processors are output from the timing generator 118 to these processors.

The host, the scanner, and the printer exchange information except for the image signal through a serial communication (COMM.) port 119.

[Control Flow]

Figure 6:
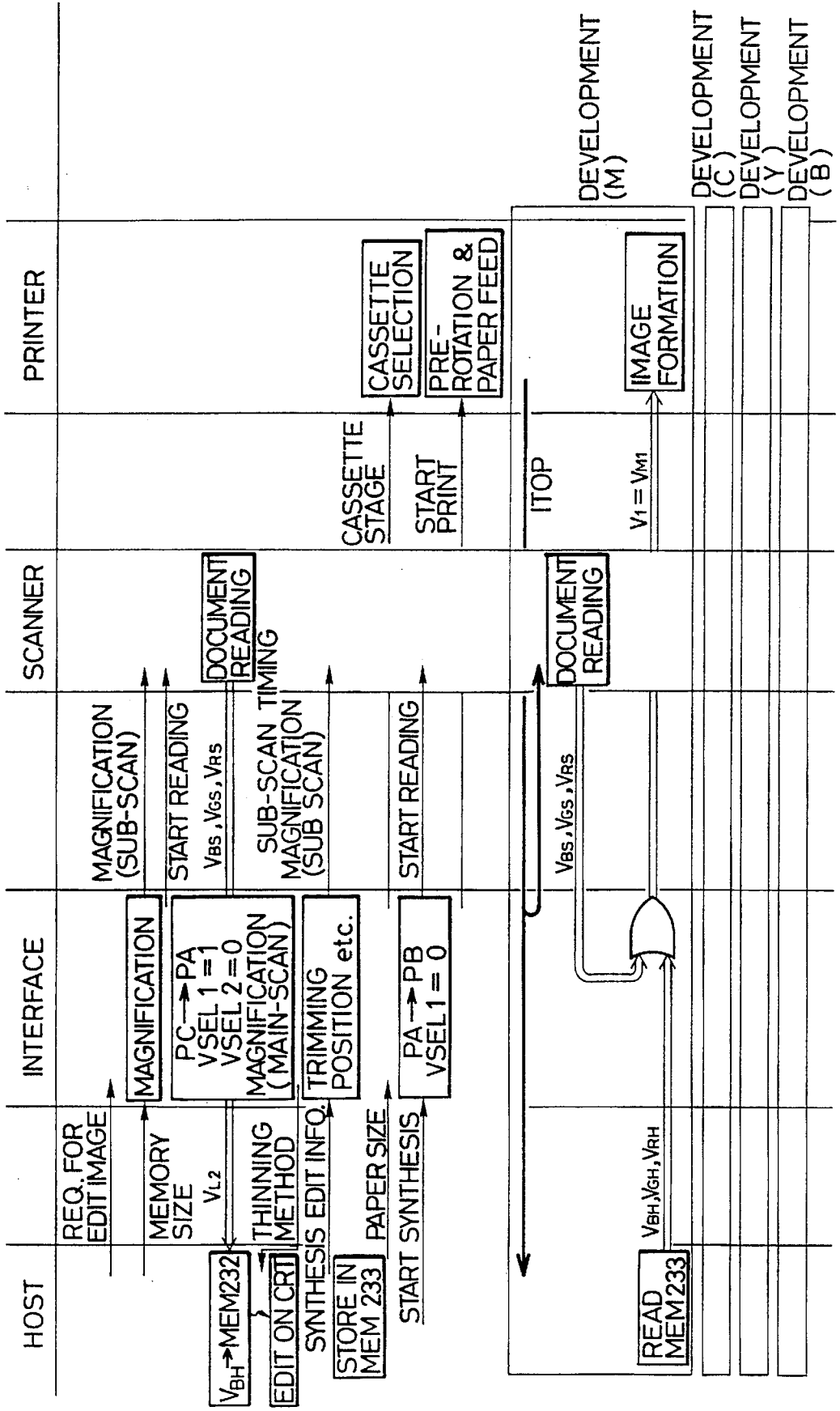
FIG. 6 shows a flow of synthesis processing according to a first embodiment of the present invention.

FIG. 6 shows the overall control flow which will be described below.

An arrow → in FIG. 6 represents serial communication, and an arrow represents an image signal flow.

The flow in FIG. 6 will be described from the upper portion to the lower portion.

Figure 2:
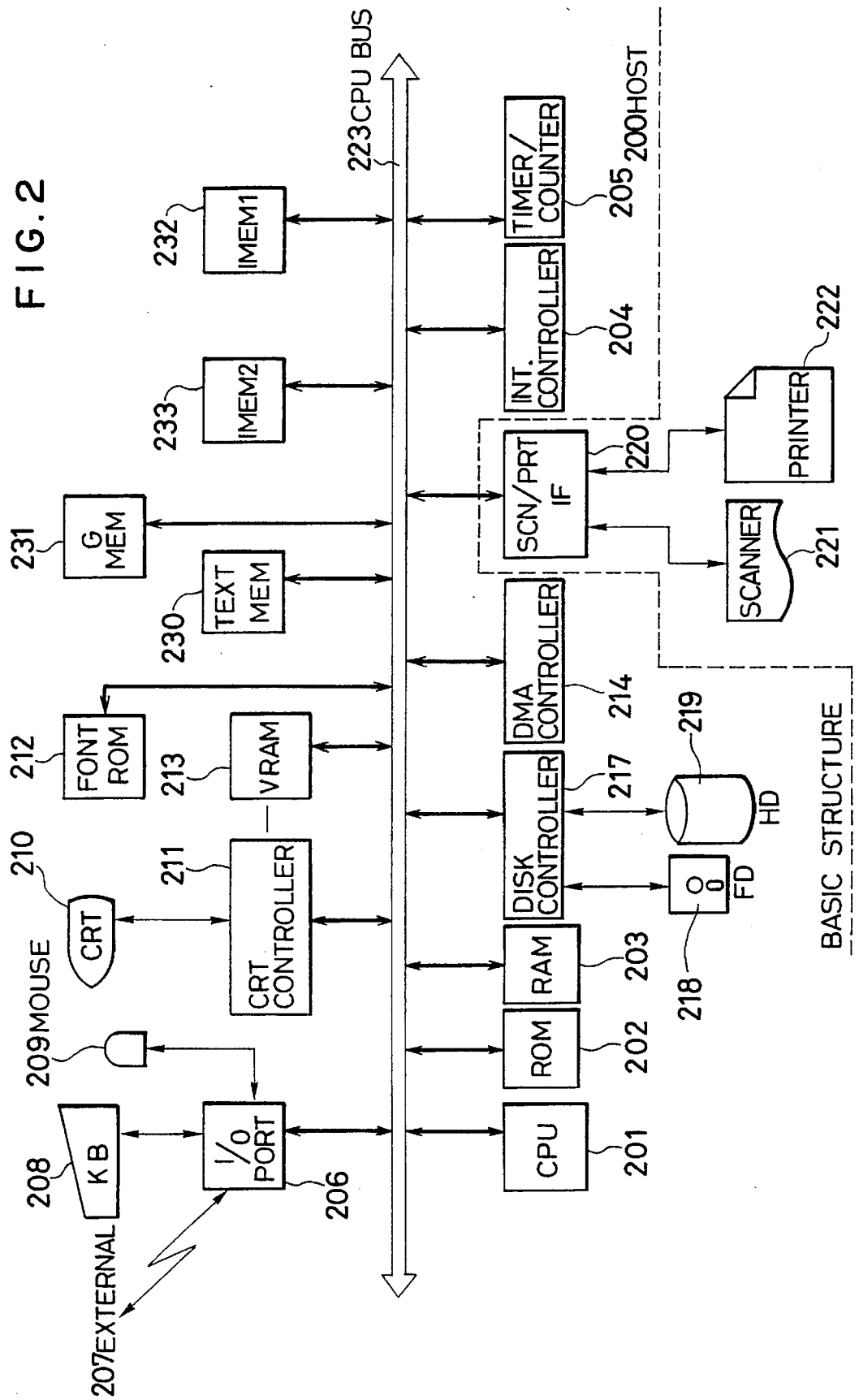
FIGS. 2 and 3 are views for explaining a conventional processor.
Figure 3:
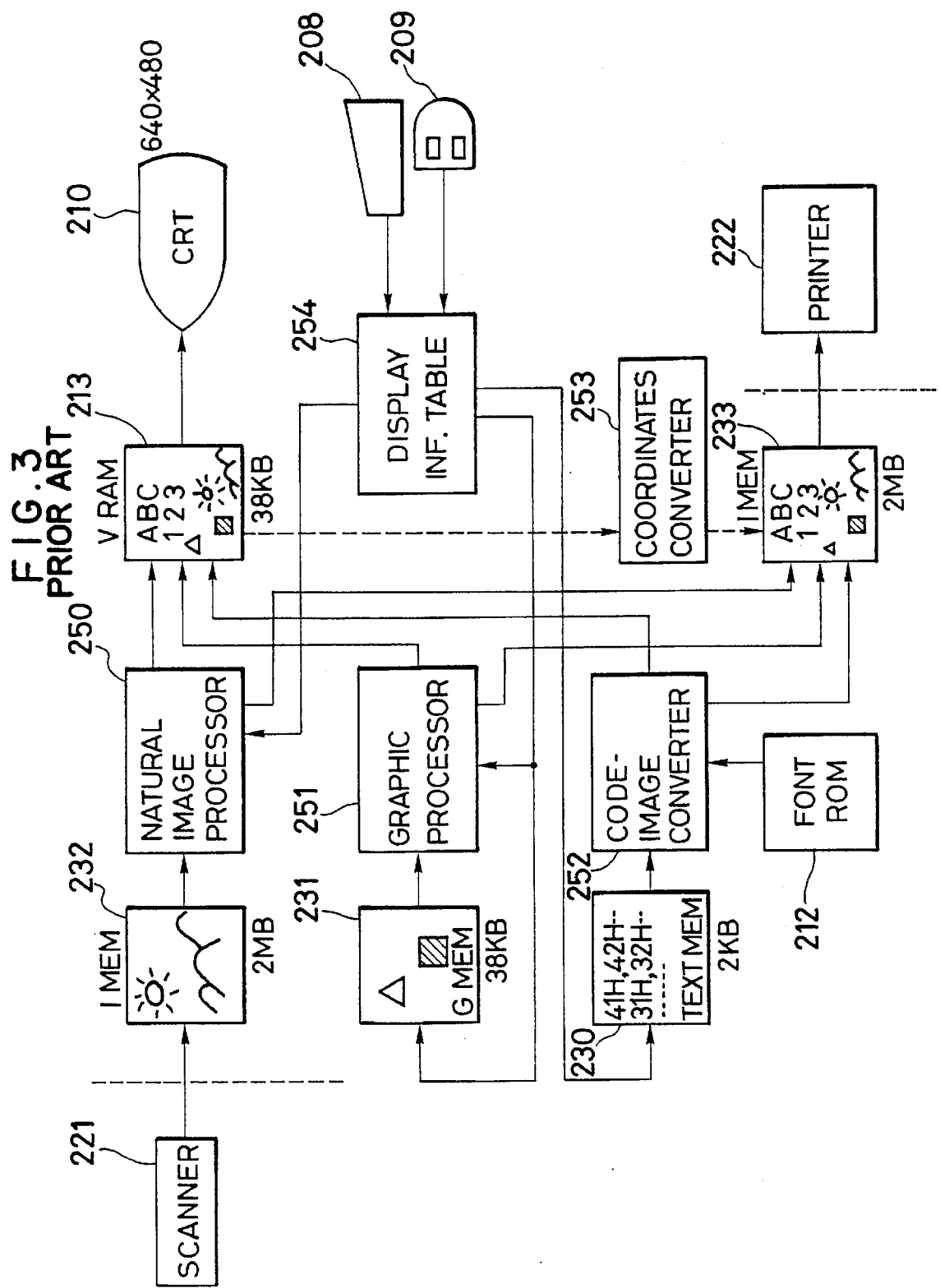

If editing of image information is requested of the interface by the host, the interface interrogates the host as to the size of the image memory 232 (basically, the number in FIG. 2 is interrogated).

The CPU 114 of the interface determines a magnification, i.e., a resolution and a tone count in accordance with the memory size. Assume that an A4 size document is to be read. When the image size is reduced to 50% with binary intensity information, required memory capacity is a maximum of 500 Kbytes. When the size is further reduced by 25%, a memory capacity can be a graphic VRAM capacity.

The interface designates a magnification in the sub-scan direction by the determined magnification and designates the start of reading to the scanner.

The port mode in the I/O controller 109 in the interface is selected so that a PC port input is to be output to the PA port. The selection signals VSEL1 and VSEL2 are set to be "1" and "0", respectively, so as to supply the signal $V_{BH}$ as the intensity information. The interface receives the image signals from the scanner as described above. The image signals from which color information, tone information, and resolution information are extracted are supplied to the host. An extraction method is signaled to the host via serial communication.

The image information supplied through the $V_{BH}$ signal lines is stored in the image memory 232 in the host. Synthesis editing is performed on the CRT using the keyboard and the PD (pointing device) on the basis of the stored image information.

In order to determine the necessary portion of a document image, or the size or position of a synthesized image, it is effective to use even the extracted image information.

Pieces of document image editing information determined by the host, i.e., a trimming position and the position and size of the synthesized image, are signaled to the interface.

The interface determines control means of the trimming processor 106, the movement processor 107, and the magnification processor 108 on the basis of these pieces of information. At the same time, the interface designates a sub-scan magnification to the scanner.

In order to adjust an output image position in the sub-scan direction, the interface also designates a relationship between the vertical sync signal ITOP supplied from the printer and an optical system drive start timing of the scanner. The interface further designates a sheet size to the printer. The interface finally designates the start of synthesis.

In order to perform synthesis, the interface switches the port mode such that the input from the port PA is to be output from the port PB. At the same time, the selection signal VSEL1 is set at "0". When the printer receives a print start instruction from the interface, pre-rotation is started and a sheet is fed.

The scanner, the host, and the interface performs operations such as scanning, memory read access, and synthesis in synchronism with the signal ITOP supplied from the printer. Since the printer according to the present invention performs image formation in accordance with a surface sequential scheme as described above, the output from the processor 104 in FIG. 1 is switched in the order magenta, cyan, yellow, and black in units of the signals ITOP. These outputs are sequentially supplied to the printer, and a synthesized printing operation is then ended.

[Conversion of Image information Size]

Figure 7:
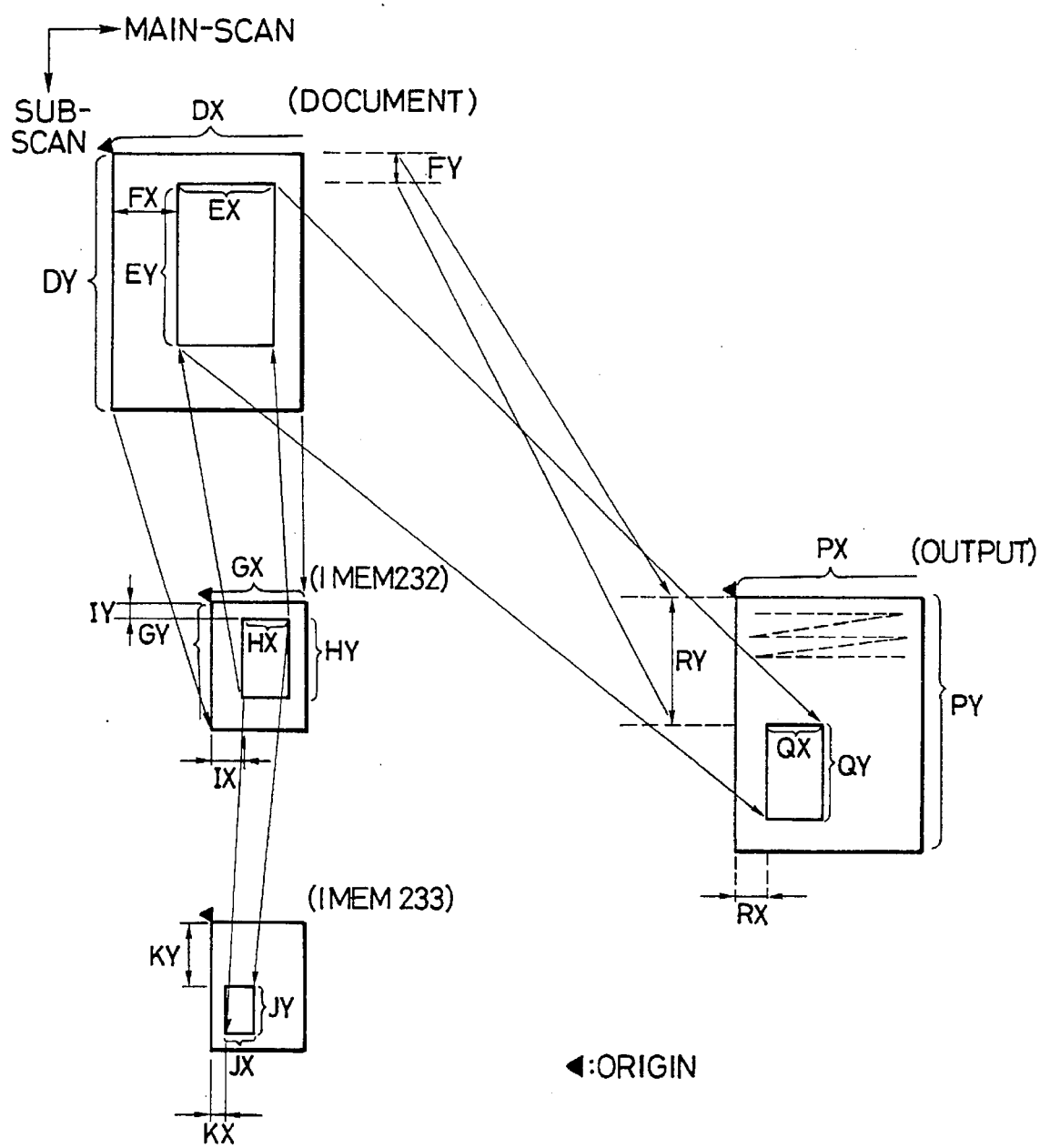
FIG. 7 is a schematic view showing conversion of an image size.

FIG. 7 shows conversion of an image information size. The size is given in units of pixels.

The interface determines a fetch magnification $M_1$ of the image memory to be min(GX/DX,GY/DY) so as to fall within sizes GX and GY of the image memory 232 which are signaled from the host to the interface.

When only the HX and HY portions at positions IX and IY from the origin of the document image in the memory 232 at the time of editing on the CRT are employed to be synthesized with the JX and JY portions at positions KX and KY on the output memory 233, host data acknowledged to the interface are IX, IY, HX, HY, KX, KY, JX, and JY.

The interface calculates main- and sub-scan read magnifications $M_{X2}$=JX/HX and $M_{Y2}$=JY/HY from these data. The interface also calculates $FX=IX/M_1$, $FY=IY/M_1$, $EX=HX/M1$, and $EY=HY/M_1$ as trimming positions on the document. In addition, the interface further calculates $RX=KX/M_1$ and $RY=KY/M_1$ as movement amounts or displacements.

The interface sends the sub-scan magnification $M_{Y2}$ and the RY as a sub-scan timing from the signal ITOP to the scanner.

An image sent from the scanner to the interface is obtained by multiplying the sub-scan size with the magnification $M_{Y2}$. Care must be taken when the interface performs sub-scan trimming.

Since the main-scan size is changed last, the one-to-one size can be used in trimming.

Character and graphic image data having synthesis blank areas in the QX and QY portions of the outputs of FIG. 7 are sent from the host to the interface in response to the sync signals ITOP and BD.

The document image is sent from the scanner at timings suitable for fitting the image in the blank portions. Therefore, the image synthesizer 101 (FIG. 1) calculates a logical OR product of $V_{XS}$ from the scanner and $V_{XH}$ (where X is B, G, or R) from the host and outputs the OR product as $V_{X1}$ (where X is B, G, or R), thereby generating a B, G, or R image signal.

In this embodiment, since main-scan magnification is performed after the two types of images are synthesized, the image must be multiplied with $1/M_{X2}$ in the host. When the image signal magnification $M_1$ is acknowledged from the scanner to the host beforehand, the value $M_{X2}$ can be calculated.

Unlike in a conventional arrangement, only character and graphic data are developed in the image memory 233. In addition, since data is printed at the printer according to raster scanning, the data need not all be developed beforehand. The memory may have a capacity equivalent to that of a buffer.

A text file formed by the host on the CRT or the like has a limited number of colors. Data corresponding to each pixel and developed in the image memory 233 may be a color code which does not have a multibit length. As a result, the host need not have a large-capacity memory. At the same time, a high-quality synthesized image can be printed.

In this first embodiment, the intensity information as the image information for generating editing information is sent to, in order, of the scanner 221, the interface 220, and the host 200. However, a desired color signal may be sent in response to a request from the host.

By changing a function of the extractor 112 in FIG. 1, information in a desired color space can be sent to the host.

In addition, R, G and B image signals may be directly sent from the scanner 221 to the host 200 when the host includes a large-capacity disc and a compressor/expander.

Furthermore, the extraction scheme of the editing image information may be signaled from the host to the scanner. The extraction scheme may be changed as needed, and information is fetched a plurality of times, thereby determining editing information such as layout.

[Second Embodiment, Interface]

Figure 8:
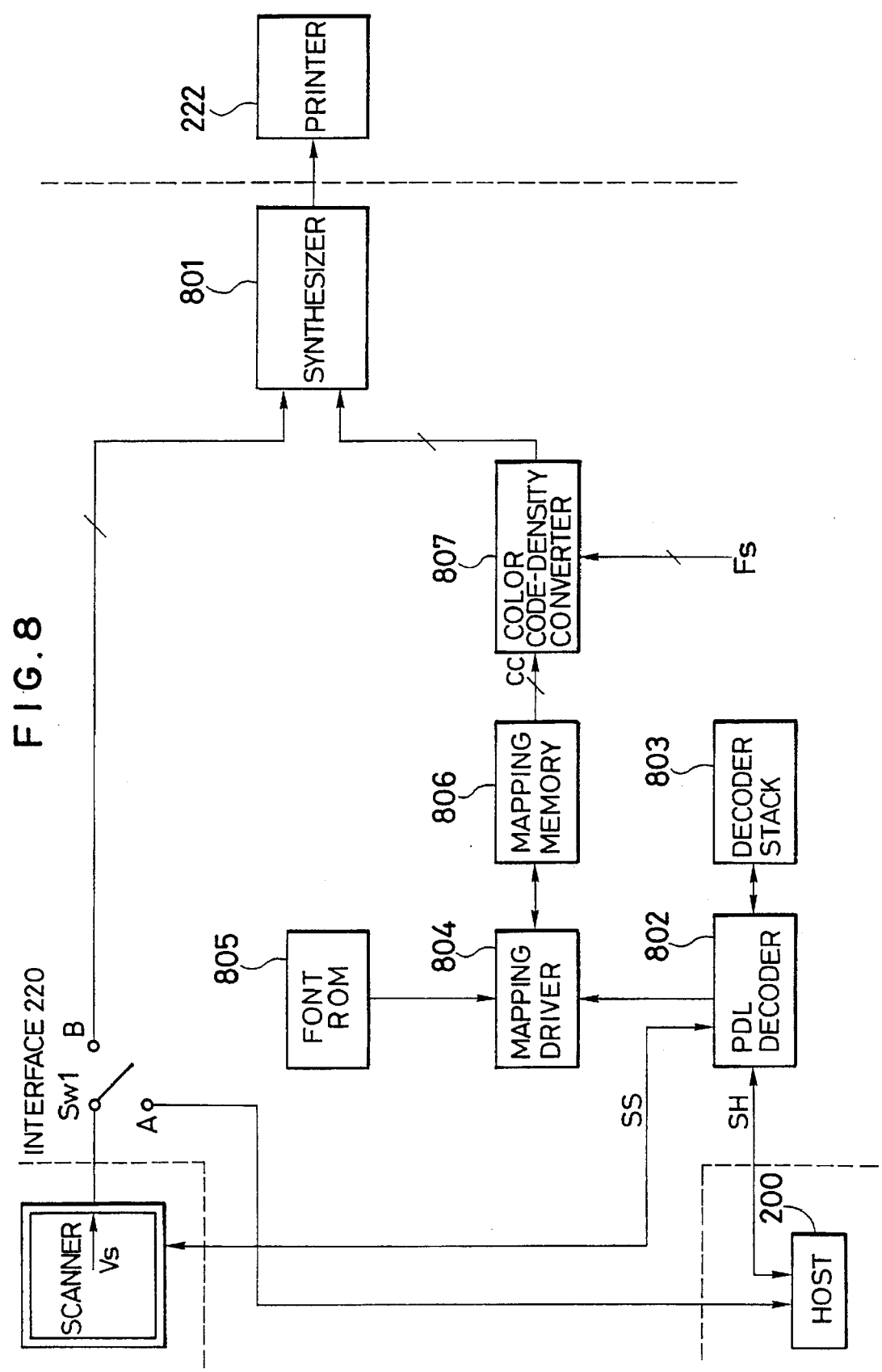
FIG. 8 is a block diagram of an interface according to a second embodiment of the present invention.

FIG. 8 is a block diagram of an interface according to a second embodiment of the present invention.

Of the image processors of FIG. 1, a scanner in FIG. 8 includes the log converter 102, the black extractor 103, the masking processor 104, the density converter 105, the trimming processor 106, the movement processor 107, the magnification processor 108, the intensity extractor 112, and the tone converter 113. An image signal $V_s$ from the scanner is extracted by an appropriate means in the same manner as in the first embodiment. A switch SW1 is set at the A position, and the image signal $V_s$ is sent to the host. At the time of synthesis output, the image signals $V_s$ are output from the scanner by a frame sequential scheme in the order M (magenta), C (cyan), Y (yellow), and Bk (black) in accordance with a printer image formation sequence. The switch SW1 is set at the B side to send the signals $V_s$ to the printer 222 through a synthesizer 801.

In the second embodiment, the text file as a so-called PDL (page description language) program is sent from the host 200 to a PDL decoder 802 in the interface 220 through a serial signal line $S_H$.

Typical PDLs are represented by POSTSCRIPT available from Adobe Corp. and by DDL, available from Imagen Corp.

For example, POSTSCRIPT is constituted as a stack-oriented language. The POSTSCRIPT program is decoded by the PDL decoder 802 while being stored in a decoder stack 803 on the RAM as needed. The decoded data is vector-raster converted by a mapping driver 804 and developed in a mapping memory 806.

Characters are stored in a font ROM 805 as bit images or outline fonts, and can be read out and developed in the mapping memory 806 as needed.

In the mapping memory 806, the bit map image is expressed as color codes, as shown in FIG. 9. Two bits correspond to one pixel in FIG. 9. That is, each pixel can be expressed in one of four colors.

FIG. 10 shows a concept of a code-density converter 807 which will be described below.

The converter 807 is constituted by a so-called table.

For example, a 2-bit code CC read out from the mapping memory 806 in correspondence with a pixel and a 2-bit image signal $F_s$ supplied from the CPU are supplied as an address signal, and a density signal is output in correspondence with the color code and a developing surface of the printer. The number of bits of the color code CC may be changed as needed.

The features of the second embodiment will be summarized as follows:

(1) Image synthesis is performed after a document image is magnified at a desired magnification;

(2) Image synthesis is performed in accordance not with the R-G-B additive system but with the M-C-Y-Bk subtractive system; and (3) Image data except for the document image is programmed and then output.

At the time of generation of editing information for synthesis according to the second embodiment, a large-capacity memory need not be used. In addition, since the PDL decoder is included in the interface, the host can perform high-quality image synthesis regardless of printer attributes.

Since necessary processing such as magnification, movement, and trimming is performed in the scanner, images can be synthesized in output sizes, thereby simplifying the circuit arrangement.

The same image synthesis position and size data as in the first embodiment are sent from the host 200 to the scanner through the interface 220 by only serial communication, and the scanner performs all conversion operations.

[Third Embodiment, Intensity Extractor]

In the first and second embodiments, the intensity information is output to the host to perform editing. In the third embodiment, an arrangement in place of the intensity extractor 112 in FIG. 1 will be described with reference to FIG. 11.

Figure 11A:
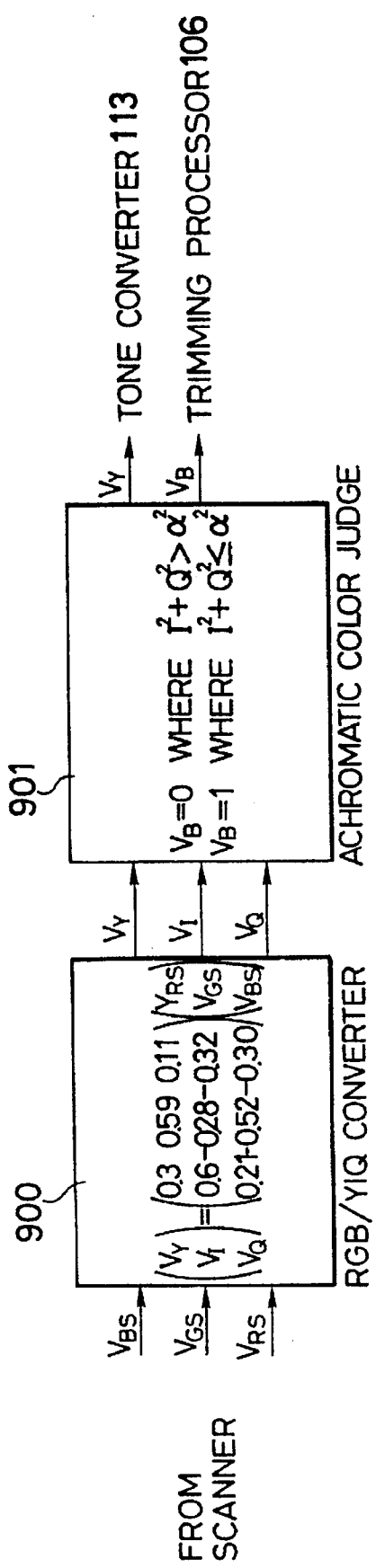
FIG. 11 is two views consisting of FIGS. 11a and 11b, for explaining a third embodiment of the present invention.

The arrangement in FIG. 11(a) is constituted by two blocks. One block is an RGB/YIQ converter 900 for converting R, G, and B signals into signals of another color space by matrix calculations In this block, $V_y$ represents a lightness (luminance), and $V_I$ and $V_Q$, respectively chromaticity and saturation. A component relatively distant from the origin (see FIG. 11(b) as the intersection between the I- and Q-axes is discriminated as a chromatic component, while a component nearer the origin is discriminated as an achromatic component. An achromatic color judge circuit 901 outputs a signal $V_B$ for distinguishing a chromatic color from an achromatic color.

The lightness $V_Y$ is supplied to the tone converter 113 and is converted into a binary signal. A binary signal $V_{L2}$ and the achromatic color signal $V_B$ are supplied to the host. The above-mentioned color space is grouped and coded, and the codes are supplied to the host, so that the host can effectively determine the color information.

As described above, processing for synthesizing and editing the text and the image on the CRT or the like on the basis of the text information and image information which are extracted and read by the scanner in a desired form is performed, and pieces of editing information as a result of synthesis and editing of the text information and image information are sent back to the scanner. Thereafter, image synthesis is performed in real time while the text and image are read and edited on the basis of the given editing information in synchronism with readout of the text information from the memory. Therefore, a high-quality synthesized output of the text and the image can be obtained without requiring a large-capacity memory.

According to the present invention as has been described above, since the PDL decoder is arranged in the interface, the host can perform high-quality image synthesis regardless of printer attributes. In addition, the scanner can perform processing such as magnification and movement, thereby easily synthesizing the text.

What is claimed is:

1. An image processing apparatus comprising:

reading means for reading an original image to generate image information, said reading means generating first image information and second image information with respect to an identical original image;

output means for outputting the first image information to an external apparatus having a display means so that said external apparatus may edit the original image by using the first image information;

receiving means for receiving text information and editing information including magnification processing information from said external apparatus; and synthesizing means for synthesizing a text image specified by the text information and an original image represented by the second image information obtained from a result of having been magnification processed by said reading means on the basis of the editing information so as to obtain an image synthesized with the text image and the original image without receiving image information corresponding to the original image from said external apparatus, wherein the first image information is degraded with respect to the second image information.

2. An apparatus according to claim 1, wherein the first image information includes one of image information in reduced resolution representation, reduced color component image information, image information in reduced tonality representation, and intensity image information.

3. An apparatus according to claim 1, including means for detecting a capacity of a storing means for storing the first image information of said external apparatus, and means for determining a format of the first image information in accordance with the detected capacity.

4. An apparatus according to claim 1, including means for analyzing a page description language, wherein said receiving means receives the text information as a program described by the page description language from said external apparatus.

5. An apparatus according to claim 1, wherein said text image and said original image are color images, and said synthesizing means synthesizes said text image and said original image in accordance with one of an additive color system and a subtractive color system.

6. An apparatus according to claim 1, wherein, after said reading means executes a read operation of the original image to generate the first image information, said reading means executes the read operation of the original image in synchronism with a synthesis operation by said synthesizing means.

7. An image processing apparatus comprising:

storing means for storing first image information obtained by reading an original image from an external apparatus;

display means for displaying the first image information;

input means for entering text information and editing information which includes editing information to edit the original image using said display means with an operation by an operator; and output means for outputting the text information and the editing information entered by said input means to said external apparatus so that said external apparatus may synthesize the original image represented by second image information obtained by re-reading after outputting the editing information and effecting magnification processing of the original image and the text image specified by the text information on the basis of the editing information, wherein the first image information is degraded with respect to the second image information.

8. An apparatus according to claim 7, wherein the first image information includes one of image information in reduced resolution representation, reduced color component image information, image information in reduced tonality representation, and intensity image information.

9. An apparatus according to claim 7, further comprising storing means for storing the first image information, and notifying means for notifying said external apparatus of a capacity of said storing means.

10. An apparatus according to claim 7, wherein said output means outputs the text information as a program described by a page description language.

11. An image processing method comprising the steps of:

generating first image information obtained by reading an original image;

outputting the first image information to an external apparatus having display means so that said external apparatus may edit the original image by using the first image information;

receiving text information and editing information including magnification processing information from said external apparatus;

generating second image information obtained by reading said original image; and synthesizing a text image specified by the text information and an original image represented by the second image information on the basis of the editing information obtained from a result of having been magnification processed in said reading step without receiving image information corresponding to the original image from said external apparatus so as to obtain an image synthesized with the text image and the original image, wherein the first image information is degraded with respect to the second image information.

12. A method according to claim 11, wherein the first image information includes one of image information in reduced resolution representation, reduced color component image information, image information in reduced tonality representation, and intensity image information.

13. A method according to claim 11, further comprising the steps of detecting a capacity of a storing means for storing the first image information of said external apparatus, and determining a format of the first image information in accordance with the detected capacity.

14. A method according to claim 11, wherein said receiving step includes a step of receiving the text information as a program described by a page description language from said external apparatus, and a step of analyzing the page description language.

15. A method according to claim 11, wherein said text image and original image are color images, and said text image and said original image are synthesized in accordance with one of an additive color system and a subtractive color system in the synthesizing step.

16. An image processing method comprising the steps of:

storing first image information obtained by reading an original image from an external apparatus;

displaying the first image information;

inputting text information and editing information which includes editing information to edit the original image using said displaying step with an operation by an operator; and outputting the text information and the editing information entered in said inputting step to said external apparatus so that said external apparatus may synthesize the original image represented by second image information obtained by re-reading after outputting the editing information and effecting magnification processing of the original image and a text image specified by the text information on the basis of the editing information, wherein the first image information is degraded with respect to the second image information.

17. A method according to claim 16, wherein the first image information includes one of image information in reduced resolution representation, reduced color component image information, image information in reduced tonality representation, and intensity image information.

18. A method according to claim 16, further comprising the steps of storing the first image information in storing means, and notifying said external apparatus of a capacity of said storing means.

19. A method according to claim 16, wherein the text information is output as a program described by a page description language in the outputting step.

* * * * *

UNITED STATES PATENT AND TRADEMARK OFFICE
CERTIFICATE OF CORRECTION

PATENT NO : 5,659,770

DATED : August 19, 1997

INVENTOR(S) : MASANORI YAMADA

Page 1 of 2

It is certified that error appears in the above-identified patent and that said Letters Patent is hereby corrected as shown below

COLUMN 2

Line 3, "and." should read --and--.

COLUMN 3

Figure 11B:
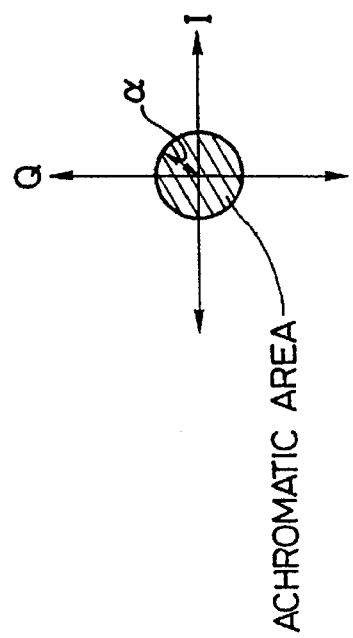

Line 53, "FIG. 11 is two views consisting of FIGS 11a and 11b," should read --FIG. 11, consisting of FIGS 11a and 11b, is two views--

COLUMN 4

Line 48, "117," should read --117 --

UNITED STATES PATENT AND TRADEMARK OFFICE
CERTIFICATE OF CORRECTION

PATENT NO : 5,659,770

DATED : August 19, 1997

INVENTOR(S) : MASANORI YAMADA

It is certified that error appears in the above-identified patent and that said Letters Patent is hereby corrected as shown below

COLUMN 5

Line 56, "arrow represents" should read
--arrow → represents--

Signed and Sealed this

Third Day of February, 1998

BRUCE LEHMAN

Attest:

*Attesting Officer*  *Commissioner of Patents and Trademarks*